(12) United States Patent
Wang et al.

(10) Patent No.: US 11,876,232 B2
(45) Date of Patent: Jan. 16, 2024

(54) GAS DIFFUSION LAYER FOR PROTON EXCHANGE MEMBRANE FUEL CELL AND PREPARATION METHOD THEREOF

(71) Applicant: DONGHUA UNIVERSITY, Shanghai (CN)

(72) Inventors: Biao Wang, Shanghai (CN); Tongqing Qu, Shanghai (CN); Xiyi Huang, Shanghai (CN)

(73) Assignee: DONGHUA UNIVERSITY, Shanghai (CN)

( * ) Notice: Subject to any disclaimer, the term of this patent is extended or adjusted under 35 U.S.C. 154(b) by 0 days.

(21) Appl. No.: 18/265,437

(22) PCT Filed: Aug. 6, 2021

(86) PCT No.: PCT/CN2021/111081
§ 371 (c)(1),
(2) Date: Jun. 6, 2023

(87) PCT Pub. No.: WO2022/252389
PCT Pub. Date: Dec. 8, 2022

(65) Prior Publication Data
US 2023/0395815 A1 Dec. 7, 2023

(30) Foreign Application Priority Data
May 31, 2021 (CN) .......................... 202110602380.6

(51) Int. Cl.
*H01M 4/88* (2006.01)
*D01D 5/088* (2006.01)
(Continued)

(52) U.S. Cl.
CPC ............ *H01M 4/8807* (2013.01); *D01D 5/04* (2013.01); *D01D 5/06* (2013.01); *D01D 5/088* (2013.01);
(Continued)

(58) Field of Classification Search
CPC D01D 5/04; D01D 5/06; D01D 5/088; D01D 5/096; D01D 5/28; H01M 4/8807;
(Continued)

(56) References Cited

U.S. PATENT DOCUMENTS

2004/0058123 A1 3/2004 Cooper et al.
2010/0035126 A1* 2/2010 Breault .................. D04H 1/542
264/103
(Continued)

FOREIGN PATENT DOCUMENTS

| CN | 1378014 A | 11/2002 |
| CN | 1884689 A | 12/2006 |

(Continued)

OTHER PUBLICATIONS

GB/T 20042.7-2014, Proton exchange membrane fuel cells—Part 7: Test method of carbon paper properties, China National Standard, 2014, pp. 1-20, Standardization Administration of China.

*Primary Examiner* — Brittany L Raymond
(74) *Attorney, Agent, or Firm* — Bayramoglu Law Offices LLC

(57) ABSTRACT

A gas diffusion layer for proton exchange membrane fuel cell and preparation method thereof are provided. The preparation method is to papermake and dry carbon fiber suspension mainly composed of a fibrous binder, water, a dispersant and carbon fibers with different aspect ratios to obtain a carbon fiber base paper, and then carbonize and graphitize under the protection of nitrogen or inert gas to obtain a gas diffusion layer for proton exchange membrane fuel cell; where the fibrous binder is a composite fiber or a blend fiber composed of a phenolic resin and other resin; where the prepared gas diffusion layer for proton exchange membrane fuel cell has a pore gradient, and the layer with the smallest pore size is an intrinsic microporous layer.

15 Claims, 1 Drawing Sheet

(51) Int. Cl.

| | | |
|---|---|---|
| *D01F 6/94* | (2006.01) | |
| *D01D 5/06* | (2006.01) | |
| *D01D 5/04* | (2006.01) | |
| *D01D 5/28* | (2006.01) | |
| *D21H 13/50* | (2006.01) | |
| *D21H 13/22* | (2006.01) | |
| *D21H 21/08* | (2006.01) | |
| *D21H 17/53* | (2006.01) | |
| *D21H 25/02* | (2006.01) | |
| *H01M 4/86* | (2006.01) | |
| *H01M 8/10* | (2016.01) | |

(52) U.S. Cl.
CPC .................. *D01D 5/28* (2013.01); *D01F 6/94* (2013.01); *D21H 13/22* (2013.01); *D21H 13/50* (2013.01); *D21H 17/53* (2013.01); *D21H 21/08* (2013.01); *D21H 25/02* (2013.01); *H01M 4/861* (2013.01); *H01M 4/8817* (2013.01); *H01M 4/8875* (2013.01); *D10B 2321/021* (2013.01); *D10B 2321/022* (2013.01); *D10B 2321/06* (2013.01); *D10B 2331/14* (2013.01); *D10B 2505/00* (2013.01); *H01M 2008/1095* (2013.01)

(58) Field of Classification Search
CPC ....... H01M 4/861; H01M 4/8875; D01F 6/94; D21H 13/22; D21H 13/50; D21H 17/53; D21H 21/08; D21H 25/02
See application file for complete search history.

(56) References Cited

U.S. PATENT DOCUMENTS

2014/0011118 A1* 1/2014 Lee ..................... C04B 35/521
  429/534
2017/0338497 A1* 11/2017 Tatsuno ............. H01M 8/0234

FOREIGN PATENT DOCUMENTS

| CN | 101047253 A | 10/2007 |
| CN | 101611509 A | 12/2009 |
| CN | 106887597 A | 6/2017 |
| CN | 107004865 A | 8/2017 |
| CN | 109478654 A | 3/2019 |
| CN | 111029605 A | 4/2020 |
| CN | 111576079 A | 8/2020 |
| CN | 111900418 A | 11/2020 |
| CN | 112490454 A | 3/2021 |
| IN | 109742409 A | 5/2019 |

* cited by examiner

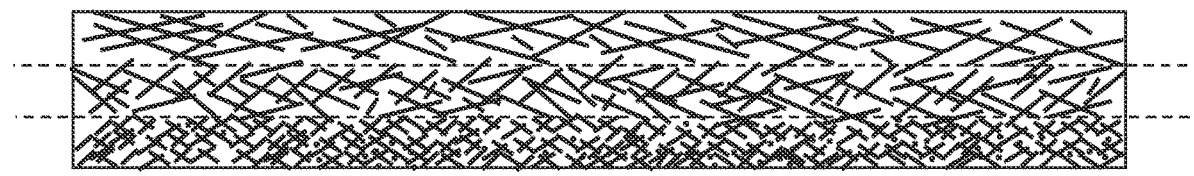

GAS DIFFUSION LAYER FOR PROTON EXCHANGE MEMBRANE FUEL CELL AND PREPARATION METHOD THEREOF

CROSS REFERENCE TO THE RELATED APPLICATIONS

This application is the national phase entry of International Application No. PCT/CN2021/111081, filed on Aug. 6, 2021, which is based upon and claims priority to Chinese Patent Application No. 202110602380.6, filed on May 31, 2021, the entire contents of which are incorporated herein by reference.

TECHNICAL FIELD

The present invention belongs to the field of fuel cell, and more particularly, relates to a gas diffusion layer for proton exchange membrane fuel cell and preparation method thereof.

BACKGROUND

The fuel cell is a new and environmentally friendly power generation device that can directly convert chemical energy stored in fuel into electrical energy. Due to its power generation without violent combustion and green conversion process, the use of fuel cells is an effective solution to the current energy crisis. Among various fuel cells, the proton exchange membrane fuel cell is considered to be one of the most promising power sources because of many advantages such as high power density, high energy conversion efficiency, low temperature start-up, no pollution, lightweight and compact. The fuel cell will produce a large amount of water during operation, and if there is no way to drain it in time, it will cause flooding in the catalytic layer, block the entire cell channel and hinder the gas transmission. Therefore, it is very important to have a channel that can both efficiently transport the gas and manage the water produced by the reaction.

The gas diffusion layer is one of the important components of the fuel cell, composed of a matrix layer with a relatively loose pore structure and a microporous layer with a relatively compact pore structure, which not only plays the role of supporting the catalytic layer and stabilizing the electrode structure, but also has various functions of providing gas channels, electron channels and drainage channels for the electrode gas. The efficiency and internal resistance of the cell are closely related to it, so improving properties of the gas diffusion layer is an important way to develop the gas-liquid transport of fuel cells.

The matrix layer of the gas diffusion layer generally needs to meet four conditions: 1) excellent electrical conductivity; 2) good air permeability; 3) proper hydrophilicity/hydrophobicity; 4) good mechanical strength. The carbon paper has become the most widely used matrix layer because of its uniform porous thin layer structure, excellent electrical conductivity and chemical stability. The conventional preparation process of the carbon paper mainly includes the preparation of carbon fiber preform, molding and curing, carbonization, graphitization and other processes. The said preform is generally prepared from carbon fibers and the binder, and the main function of the binder is to bond the overlapped carbon fibers together to form a plane superposition structure, which not only makes the structure of the preform more compact and enhances its mechanical properties, but also connects more conductive circuits and improves conductive properties. Therefore, the residual carbon rate of the binder, the bond strength between the binder and the carbon fiber, and the distribution uniformity of the binder and the carbon fiber are important factors that affect properties of the preform. The binder can be solid, such as powder and fibers, or liquid, but powder binders usually have problems of uneven distribution, resulting in poor material properties; the liquid binder usually has problems such as uncontrollable adhesion amount and high contamination. Chinese patent CN111900418A discloses a method for preparing a carbon fiber paper preform for a gas diffusion layer of a fuel cell, although the addition of a small amount of nanocellulose can significantly improve the dispersion of carbon fibers, the use of vacuum negative pressure suction process to immerse the binder resin into the carbon paper still cannot solve the problems of uneven distribution and uncontrollable adhesion amount inside the carbon paper caused by the resin's own fluidity and gravity, which will eventually lead to poor uniformity of the carbon paper. Chinese patent CN101047253A discloses a carbon fiber paper bonded with acrylic fibers, introducing acrylic fibers into carbon fiber laminated sheets through a conventional wet papermaking process by, and then curing and carbonizing to obtain the carbon fiber paper, and the binder in this carbon fiber paper is uniformly distributed, but due to the low residual carbon rate of acrylic fibers, the bond strength between carbon fibers after carbonization is weak. Therefore, inventing a controllable and adherable preform binder with a high residual carbon rate and using in the preparation of preforms, can not only alleviate the environmental and energy crisis, but also have strategic importance in improving the performance of the gas diffusion layer.

The main function of the microporous layer of the gas diffusion layer is to reduce the contact resistance between the catalytic layer and the substrate layer, to redistribute the gas and water and prevent the "flooding" of the electrode catalytic layer. At present, it is mainly made of carbon black or graphite powder mixed with a small amount of binder, sprayed or brushed on the surface of the carbon fiber porous electrode. Chinese patent CN 112490454A prepares a gas diffusion layer with an integrated gradient structure consisting of a carbon fiber layer and a microporous layer by means of transfer printing, which improves the bonding ability between the microporous layer and the carbon fiber substrate, and improves the conductivity and gas transmission ability, but the process is tedious and complicated, which is not conducive to large-scale production and preparation. Chinese patent CN201811457447.6 prepares a microporous layer by using sulfur atom-doped graphene and fluorinated ethylene-propylene copolymer, which shows good cell performance in medium and low humidity environments, and the maximum power density is increased by 55% compared with conventional microporous layers, but this preparation process is complicated and uses extremely costly graphene. Therefore, inventing a gas diffusion layer with an intrinsic microporous layer and realizing the integrated molding of the carbon paper and the microporous layer during the preparation process, not only makes the process operation simple, but also reduces the process cost in order to realize large-scale industrial production.

At present, domestic manufacturers of fuel cell reactors basically use outsourced diffusion layers or treat self-made microporous layers on the surface of outsourced carbon paper. The hydrophobicity/hydrophilicity of the diffusion layer used is relatively fixed and cannot meet the complex operating conditions of fuel cells, which determines that the water management process of the current commercial fuel cell diffusion layer still needs to be optimized. Chinese patent CN111029605A uses hydrophobic agent-treated carbon paper as the support layer, a hydrophobic agent, a conductive agent and a dispersant as the microporous layer slurry, uniformly spraying on one side of the support layer, and then spraying on the microporous layer with a hydrophilic agent in an atomized manner, to make a gas diffusion layer with hydrophilic and hydrophobic synergistic structure, however, when the current density is high, the generated water is easily accumulated in the hydrophilic area of the microporous layer, resulting in flooding. Patent CN1378014A firstly prepares two carbon paper slurries with different compositions and hydrophobic properties, then filters the pulp twice, presses into shape and then obtains them after post-treatment, so that the two sides have different hydrophilic and hydrophobic properties after molding, and the raw materials are cheap and easy to obtain, however, the carbon paper formed by pressing the pulp twice will cause cracks in the middle, reducing its mechanical and conductive properties. Therefore, how to introduce hydrophilic and hydrophobic channels in the process of preparing carbon paper to optimize its gas-liquid transport function is the focus of current research.

SUMMARY

The primary object of the present invention is to provide a gas diffusion layer for proton exchange membrane fuel cell and preparation method thereof, so as to overcome the inadequacies of the prior art.

To this end, the technical schemes of the invention are as follows:

The method for preparing a gas diffusion layer for proton exchange membrane fuel cell, including that papermaking and drying carbon fiber suspension mainly composed of a fibrous binder, water, a dispersant and carbon fibers with different aspect ratios to obtain a carbon fiber base paper, and then carbonizing and graphitizing under the protection of nitrogen or inert gas to obtain a gas diffusion layer for proton exchange membrane fuel cell;
  wherein the fibrous binder is a fibrous binder based on phenolic resin, which is a composite fiber or a blend fiber composed of phenolic resin and other resins;
  wherein the other resin is one or more selected from the group consisting of polyvinyl alcohol, polyvinyl formaldehyde, polyvinyl butyral, polyethylene and polypropylene.

The following preferred technology program is presented to give a detailed description for this invention:

In the preparing method of the gas diffusion layer for proton exchange membrane fuel cell, wherein the length of the carbon fiber is 0.5-20 mm (if the length of the carbon fiber is lower than 0.5 mm, it will lead to deterioration of the mechanical properties of the gas diffusion layer; if the length of the carbon fiber is higher than 20 mm, it will lead to deterioration of the dispersion of the carbon fiber in the dispersant, making it difficult to be made into paper); wherein the aspect ratio of the carbon fiber is 100-3000, the mass of carbon fibers with the aspect ratio in the interval [100, 500) accounts for 0-10 wt % of the total mass of carbon fibers, the mass of carbon fibers with the aspect ratio in the interval [500, 1000) accounts for 60-84 wt % of the total mass of carbon fibers, the mass of carbon fibers with the aspect ratio in the interval [1000, 2000) accounts for 5-25 wt % of the total mass of carbon fibers, and the mass of carbon fibers with the aspect ratio in the interval [2000, 3000] accounts for 1-5 wt % of the total mass of carbon fibers. The carbon fiber with a small aspect ratio has a larger settling velocity in water and can form a smaller pore size in the gas diffusion layer, while the carbon fiber with a large aspect ratio has a smaller settling velocity in water and can form a larger pore size in the gas diffusion layer, Therefore, during the process of papermaking, due to the difference in settling velocity, the carbon fiber base paper with a pore gradient by decreasing the pore size from top to bottom can be formed, thereby preparing a gas diffusion layer with a pore gradient; wherein the amount of the carbon fiber in the carbon fiber suspension is 0.01-5 wt % of the amount of water (if the amount of the carbon fiber is lower than 0.01 wt % of the amount of water, it will lead to higher preparation cost; if the amount of the carbon fiber is higher than 5 wt % of the amount of water, it will lead to difficulty in dispersion of the carbon fiber in water, resulting in poor performance of the obtained gas diffusion layer);
  wherein the fibrous binder has a diameter of 5-50 μm, a length of 3-10 mm, and a residual carbon rate of 6-50%, and the content of the fibrous binder in the carbon fiber base paper is 5-30 wt % (if the content is lower than 5 wt %, it will lead to poor adhesion of the carbon fiber and poor mechanical properties of the obtained gas diffusion layer; if the content is higher than 30 wt %, it will lead to waste of the binder);
  wherein the dispersant is polyethylene oxide or Tween 60, and the amount of the dispersant in the carbon fiber suspension is 0.05-1.5 wt % of the amount of water, (if the amount of the dispersant is lower than 0.05 wt % of the amount of water, it will lead to insufficient adsorption and deterioration of the dispersion, and the carbon fiber is difficult to disperse effectively in water; if the amount of the dispersant is higher than 1.5 wt % of the amount of water, it will lead to the waste of the dispersant);
  wherein the viscosity of dispersion composed of the dispersant and water is 100-2000 Pa·s in the carbon fiber suspension (if the viscosity is lower than 100 Pa·s, the carbon fiber cannot be dispersed effectively; if the viscosity is higher than 2000 Pa·s, the dispersant will be wasted).

In the preparing method of the gas diffusion layer for proton exchange membrane fuel cell, wherein the carbon fiber suspension also contains carbon powder with graphite structure (such as carbon nanotube, graphene, conductive carbon black, etc.), and the content of the carbon powder with graphite structure in the carbon fiber base paper is 2-60 wt % (if the content is lower than 2 wt %, it will not be able to effectively reduce the resistivity of the gas diffusion layer; if the content is higher than 60 wt %, it will cause the agglomeration of carbon powder and cannot be evenly dispersed in the gas diffusion layer).

In the preparing method of the gas diffusion layer for proton exchange membrane fuel cell, wherein the carbon fiber suspension also contains ceramic fibers (such as zirconia fibers and alumina fibers, and ceramic fibers are able to introduce hydrophilic channels in the gas diffusion layer), the amount of the ceramic fiber in the carbon fiber suspension is 0.5-5 wt % of the amount of the carbon fiber (if the amount of the ceramic fiber is lower than 0.5 wt % of the amount of the carbon fiber, it will cause insufficient hydrophilic channels in the gas diffusion layer; if the amount of the ceramic fiber is higher than 5 wt % of the amount of the carbon fiber, it will cause deterioration of the conductivity properties of the gas diffusion layer), and the length of the ceramic fiber is 1-3 mm (if the length is lower than 1 mm, it will cause hydrophilic channels not being established effectively; if the length is higher than 3 mm, it will cause uneven dispersion in the gas diffusion layer).

In the preparing method of the gas diffusion layer for proton exchange membrane fuel cell, wherein a drying temperature is 50-150° C. (if the drying temperature is lower than 50° C., it will cause difficulty in fully dry; if the drying temperature is higher than 150° C., it will cause partial pyrolysis of the binder, and affect properties of the gas diffusion layer), and a drying time is 5-90 min (if the drying time is lower than 5 min, it will cause insufficient drying time and the solvent will not be completely volatilized; if the drying time is higher than 90 min, it will cause increased preparation time, higher preparation costs and waste of resources); wherein a carbonization temperature is 1000-1300° C. (if the carbonization temperature is lower than 1000° C., the carbonization is incomplete, it will cause the binder not being effectively carbonized and deterioration of the conductivity properties of the gas diffusion layer; if the carbonization temperature is higher than 1300° C., it will cause an increase in the cost), and a carbonization time is 10-60 min (if the carbonization time is lower than 10 min, it will cause the binder not being fully carbonized, and poor conductivity of the gas diffusion layer; if the carbonization time is higher than 60 min, it will cause an increase in the cost of preparing the gas diffusion layer); wherein a graphitization temperature is 1500-2400° C. (if the graphitization temperature is lower than 1500° C., it will cause low degree of graphitization of the gas diffusion layer and poor conductivity; if the graphitization temperature is higher than 2400° C., it will cause the pyrolysis of the ceramic fiber, and the hydrophilic channel cannot be formed in the gas diffusion layer), and a graphitization time is 5-60 min (if the graphitization time is lower than 5 min, it will cause the inability to graphitize the gas diffusion layer effectively and poor conductivity; if the graphitization time is higher than 60 min, it will increase the preparation cost of the gas diffusion layer).

In the preparing method of the gas diffusion layer for proton exchange membrane fuel cell, before carbonization, wherein the carbon fiber base paper is subjected to a cross-linking and curing treatment, to avoid uneven temperature control during graphitization, and the cross-linking is a chemical cross-linking or a hot-pressing cross-linking;
wherein the process of the chemical cross-linking is: first, immersing the carbon fiber base paper in a cross-linking bath composed of formaldehyde, hydrochloric acid and water (the bath ratio is not limited, as long as complete infiltration can be achieved), pretreating at 22-25° C. for 24-60 h, then heating the cross-linking bath at a heating rate of 130-170° C./h until the solution boils, holding for 0.5-3 h, and last, taking out the carbon fiber raw paper, washing and drying; wherein the content of formaldehyde in the cross-linking bath is 18.5 wt %, and the concentration of hydrochloric acid is 12-18 wt %;
wherein a temperature of hot-pressing cross-linking is 140-300° C. (if the curing temperature is lower than 140° C., it will lead to incomplete curing of the binder, excessive thermal decomposition in the subsequent carbonization process, and poor performance of the gas diffusion layer; if the curing temperature is higher than 300° C., it will lead to energy waste and cost increase), a time of hot-pressing cross-linking is 5-30 min (if the curing time is lower than 5 min, it will not be cured sufficiently; if the curing time is higher than 30 min, it will increase the cost of preparing the gas diffusion layer), and a pressure applied to the carbon fiber base paper is 5-15 MPa (if the curing pressure is lower than 5 MPa, the roughness of the gas diffusion layer will increase and the thickness will be uneven; if the curing pressure is higher than 15 MPa, it will lead to an increase in cost).

In the preparing method of the gas diffusion layer for proton exchange membrane fuel cell, wherein the phenolic resin is a thermoplastic phenolic resin, a thermosetting phenolic resin or a blend of thermoplastic phenolic resin and thermosetting phenolic resin with a mass ratio of (9-1):(1-9); wherein the content of phenolic resin in the fibrous binder is 10-50 wt/o; wherein the composite fiber is a sea-island fiber, a sheath-core fiber, a side-by-side fiber or a segmented-pie fiber; wherein the blend fiber is made from two or more resins prepared by melt-blending spinning or solution-blending spinning.

In the preparing method of the gas diffusion layer for proton exchange membrane fuel cell, wherein the steps of melt-blending spinning are as follows:
(5) putting the phenolic resin and the other resin into a screw for melting to obtain a uniformly mixed phenolic resin/other resin melt;
(6) extruding the melt through the spinneret hole to form a thin stream of melt;
(7) cooling and curing the thin stream of melt to form an as-spun fiber;
(8) oiling and winding the as-spun fiber to obtain the blend fiber;
wherein the steps of solution-blending spinning are as follows:
(4) adding the phenolic resin and the other resin to the solvent (a mixture of alcohols, water, dimethyl sulfoxide, a mixture of ethanol and ethyl acetate, wherein the alcohol is one or more selected from the group consisting of methanol, ethanol, propylene glycol and n-butanol), and stirring at 25-98° C. until completely dissolving to obtain a phenolic resin/other resin blend solution;
(5) putting the phenolic resin/other resin blend solution at 20-25° C. for more than 6 h, then vacuum deaerating to obtain the spinning solution;
(6) performing dry spinning, wet spinning or dry-wet spinning on the spinning solution to obtain the as-spun fiber, then stretching the as-spun fiber to obtain the blend fiber;
in the phenolic resin/other resin blend solution, wherein the total content of the phenolic resin and the other resin is 5-50 wt %, and the mass ratio of the other resin to the phenolic resin is (9-5):(1-5);
wherein the viscosity of the spinning solution is 20-2000 Pa·s;
wherein the dry spinning involves technological parameters: a tank temperature of 25-95° C., a hot air temperature in the dry spinning tunnel of 25-190° C., and a spinneret draft ratio of 0.4-1.8;
wherein the wet spinning involves technological parameters: a coagulation bath temperature of 25-65° C., and a spinneret draft ratio of (−0.5)-1.0;
wherein the dry-wet spinning involves technological parameters: a tank temperature of 25-95° C., a coagulation bath temperature of 0-25° C., and a spinneret draft ratio of 0.55-1.35.

The present invention also provides a gas diffusion layer for proton exchange membrane fuel cell prepared by any one of the above preparation methods, wherein a pore size increases or decreases along the thickness direction (that is, with a pore gradient), and the layer with the smallest pore size is an intrinsic microporous layer; this structure facilitates the radial water transport of the gas diffusion layer, which is conducive to the water discharge of the fuel cell; when the carbon fiber suspension also contains the ceramic fiber during the preparation process, the obtained gas diffusion layer for proton exchange membrane fuel cell also has hydrophilic channels composed of the ceramic fiber.

As a preferred technology program:

wherein the gas diffusion layer for proton exchange membrane fuel cell, has a thickness of 80-220 μm, a porosity of 60%-80%, a contact angle with water of 120-155°, a tensile strength of 10-30 MPa, a normal resistivity of 55-70 mΩ·cm, an in-plane resistivity of 3.5-7.0 mΩ·cm, and a permeability of 1850-2100 (mL·mm)/(cm2·h·mmAq). In the present invention, the tests of tensile strength, normal resistivity, in-plane resistivity and permeability are all carried out according to the test method of charcoal paper properties in Part VII with reference to GB/T20042.7-2014. The normal resistivity of the prior art is about 80 mΩ·cm, and the in-plane resistivity is 4.7-5.8 mΩ·cm. The conductivity of the present invention is better than that of the existing carbon paper.

The mechanism of this invention could be described as follows.

The preparation of the gas diffusion layer currently requires processes of papermaking and impregnation of the liquid binder, and the liquid binder usually has problems such as uncontrollable adhesion amount and high contamination, however, the present invention prepares the fibrous binder by spinning method, which can be added during the process of papermaking, simplifying the preparation steps and making it environmentally friendly; at present, the microporous layer is mainly made of carbon black or graphite powder mixed with a small amount of binder, sprayed or brushed on the surface of the carbon fiber porous electrode, and the operation steps are complicated, however, the present invention realizes the integrated molding of the carbon paper and the microporous layer during the preparation process, and reduces the subsequent coating preparation of the microporous layer, which not only has simple process operation, but also reduces the process cost to realize large-scale industrial production; the present invention adds ceramic fibers in the preparation of the gas diffusion layer, which can introduce hydrophilic channels into the gas diffusion layer, so that the water generated by the cell reaction can be effectively discharged to prevent flooding; with hydrogen and air as the reaction gas, the results of the single cell operated at 60-80° C. show that the maximum power density of the cell is 300-340 mWcm-2, which is about 20% higher than the maximum power of the cell using the conventional gas diffusion layer. In addition, the gas diffusion layer of the present invention is formed by one-time pressure filtration, so the bonding between carbon fibers is relatively firm, and less likely to cause cracks in the middle.

Benefits:

Compared with the prior art, the present invention has the following advantages:

(1) The present invention prepares phenolic resins and other resins into fibers as binders, solving the problems of uneven distribution and uncontrollable adhesion amount due to fluidity and gravity in the process of impregnating phenolic, and also solving the problem of low residual carbon rate of pure PVA, PVF, PVB and other fiber binders, and the preparation process of the present invention has less emissions and is environmentally friendly;

(2) The present invention forms the intrinsic microporous layer in the preparation of the gas diffusion layer, realizes the integrated molding of the carbon paper and the microporous layer, reduces the subsequent coating preparation of the microporous layer, and has a simple preparation process; this is due to different aspect ratios of carbon fibers and the different settling speeds in the aqueous media, so the base paper with a pore gradient will be formed during the mixing and papermaking process, and the side with smaller porosity can act as a microporous layer for the gas diffusion layer; in addition, the added carbon powder with graphite structure can also act as a microporous layer;

(3) The present invention adds ceramic fibers in the preparation of the gas diffusion layer, which can introduce hydrophilic channels into the gas diffusion layer, so that the water generated by the cell reaction can be effectively discharged to prevent flooding.

BRIEF DESCRIPTION OF THE DRAWING

The FIGURE is a cross-sectional schematic diagram of a gas diffusion layer.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

The FIGURE is the cross-sectional schematic diagram of the gas diffusion layer prepared by the invention, as can be seen from the FIGURE, carbon fibers with different aspect ratios can form different pore size structures, the carbon fiber with larger aspect ratio forms larger pore size, while the carbon fiber with smaller aspect ratio forms smaller pore size, and there is a pore gradient with decreasing pore sizes from top to bottom, and the bottom layer is the microporous layer.

The thermoplastic phenolic resin has a molecular weight range of 1000-2500, and the grade is PF-5400;

The thermosetting phenolic resin has a molecular weight range of 1500-3000, and the grade is PF2605.

TABLE 1

| Number | Types of fibrous binder as a composite fiber |
|--------|----------------------------------------------|
| F-1 | The fibrous binder is a fibrous binder based on phenolic resin, which is a sea-island composite fiber composed of phenolic resin (thermoplastic phenolic resin) and polyvinyl alcohol, with the content of phenolic resin of 10 wt %, the diameter of 5 μm, the length of 3 mm, and the residual carbon rate of 6%. |
| F-2 | The fibrous binder is a fibrous binder based on phenolic resin, which is a sheath-core composite fiber composed of phenolic resin (thermoplastic phenolic resin) and polyvinyl formaldehyde, with the content of phenolic resin of 15 wt %, the diameter of 15 μm, the length of 5 mm, and the residual |

TABLE 1-continued

| Number | Types of fibrous binder as a composite fiber |
|---|---|
| | carbon rate of 20%. |
| F-3 | The fibrous binder is a fibrous binder based on phenolic resin, which is a side-by-side or segmented-pie composite fiber composed of phenolic resin (a blend of thermoplastic phenolic resin and thermosetting phenolic resin with a mass ratio of 1:9) and polyvinyl butyral, with the content of phenolic resin of 30 wt %, the diameter of 30 μm, the length of 8 mm, and the residual carbon rate of 40%. |
| F-4 | The fibrous binder is a fibrous binder based on phenolic resin, which is a segmented-pie composite fiber composed of phenolic resin (thermosetting phenolic resin) and polyethylene, with the content of phenolic resin of 50 wt %, the diameter of 50 μm, the length of 10 mm, and the residual carbon rate of 50%. |

Example 1

A fibrous binder, prepared by a melt-blending spinning method in the following steps:
(1) putting the phenolic resin (thermoplastic phenolic resin) and polyethylene into a screw for melting to obtain a uniformly mixed phenolic resin/polyethylene melt;
(2) extruding the melt through the spinneret hole to form a thin stream of melt;
(3) cooling and curing the thin stream of melt to form an as-spun fiber;
(4) oiling and winding the as-spun fiber to obtain the blend fiber.

The content of the phenolic resin in the prepared fibrous binder is 10 wt %, and the fibrous binder has the diameter of 10 μm, the length of 7 mm, and the residual carbon rate of 10%.

Example 2

A fibrous binder, prepared by a melt-blending spinning method in the following steps:
(1) putting the phenolic resin (thermosetting phenolic resin) and polypropylene into a screw for melting to obtain a uniformly mixed phenolic resin/polypropylene melt;
(2) extruding the melt through the spinneret hole to form a thin stream of melt;
(3) cooling and curing the thin stream of melt to form an as-spun fiber;
(4) oiling and winding the as-spun fiber to obtain the blend fiber.

The content of the phenolic resin in the prepared fibrous binder is 20 wt %, and the fibrous binder has the diameter of 20 μm, the length of 5 mm, and the residual carbon rate of 30%.

Example 3

A fibrous binder, prepared by a melt-blending spinning method in the following steps:
(1) putting the phenolic resin (a blend of thermoplastic phenolic resin and thermosetting phenolic resin with a mass ratio of 9:1) and polyethylene into a screw for melting to obtain a uniformly mixed phenolic resin/polyethylen melt;
(2) extruding the melt through the spinneret hole to form a thin stream of melt;
(3) cooling and curing the thin stream of melt to form an as-spun fiber;
(4) oiling and winding the as-spun fiber to obtain the blend fiber.

The content of the phenolic resin in the prepared fibrous binder is 30 wt %, and the fibrous binder has the diameter of 27 μm, the length of 8 mm, and the residual carbon rate of 50%.

Example 4

A fibrous binder, prepared by a solution-blending spinning method in the following steps:
(1) adding the phenolic resin (thermoplastic phenolic resin) and the other resin (polyvinyl butyral) to the solvent (ethanol), and stirring at 25° C. until completely dissolving to obtain a phenolic resin/other resin blend solution; in the phenolic resin/other resin blend solution, wherein the total content of the phenolic resin and the other resin is 25 wt %, and the mass ratio of the other resin to the phenolic resin is 9:1;
(2) putting the phenolic resin/other resin blend solution at 20° C. for 6 h, then vacuum deaerating to obtain the spinning solution with the viscosity of 700 Pa·s;
(3) performing dry spinning on the spinning solution to obtain the as-spun fiber, then stretching the as-spun fiber to obtain the blend fiber;
wherein the dry spinning involves technological parameters: the tank temperature of 25° C., the hot air temperature in the dry spinning tunnel of 90° C., and the spinneret draft ratio of 0.8.

The prepared fibrous binder has the diameter of 10 μm, the length of 4 mm, and the residual carbon rate of 7%.

Example 5

A fibrous binder, prepared by a solution-blending spinning method in the following steps:
(1) adding the phenolic resin (thermosetting phenolic resin) and the other resin (polyvinyl alcohol) to the solvent (methanol), and stirring at 25° C. until completely dissolving to obtain a phenolic resin/other resin blend solution; in the phenolic resin/other resin blend solution, wherein the total content of the phenolic resin and the other resin is 5 wt %, and the mass ratio of the other resin to the phenolic resin is 8:2;
(2) putting the phenolic resin/other resin blend solution at 21° C. for 7 h, then vacuum deaerating to obtain the spinning solution with the viscosity of 20 Pa·s;
(3) performing wet spinning on the spinning solution to obtain the as-spun fiber, then stretching the as-spun fiber to obtain the blend fiber;
wherein the wet spinning involves technological parameters: the coagulation bath temperature of 45° C., and the spinneret draft ratio of −0.1.

The prepared fibrous binder has the diameter of 15 μm, the length of 5 mm, and the residual carbon rate of 12%.

Example 6

A fibrous binder, prepared by a solution-blending spinning method in the following steps:
(1) adding the phenolic resin (a blend of thermoplastic phenolic resin and thermosetting phenolic resin with a mass ratio of 3:7) and the other resin (polyvinyl alcohol) to the solvent (dimethyl sulfoxide), and stirring at 89° C. until completely dissolving to obtain a phenolic resin/other resin blend solution; in the phenolic resin/other resin blend solution, wherein the total content of the phenolic resin and the other resin is 28 wt %, and the mass ratio of the other resin to the phenolic resin is 7:3;

(2) putting the phenolic resin/other resin blend solution at 22° C. for 8 h, then vacuum deaerating to obtain the spinning solution with the viscosity of 80 Pa·s;

(3) performing dry-wet spinning on the spinning solution to obtain the as-spun fiber, then stretching the as-spun fiber to obtain the blend fiber;

wherein the dry-wet spinning involves technological parameters: the tank temperature of 80° C., the coagulation bath temperature of 25° C., and the spinneret draft ratio of 1.15.

The prepared fibrous binder has the diameter of 20 μm, the length of 6 mm, and the residual carbon rate of 32%.

Example 7

A fibrous binder, prepared by a solution-blending spinning method in the following steps:

(1) adding the phenolic resin (a blend of thermoplastic phenolic resin and thermosetting phenolic resin with a mass ratio of 1:9) and the other resin (polyvinyl butyral) to the solvent (dimethyl sulfoxide), and stirring at 70° C. until completely dissolving to obtain a phenolic resin/other resin blend solution; in the phenolic resin/other resin blend solution, wherein the total content of the phenolic resin and the other resin is 50 wt %, and the mass ratio of the other resin to the phenolic resin is 5:5;

(2) putting the phenolic resin/other resin blend solution at 23° C. for 8 h, then vacuum deaerating to obtain the spinning solution with the viscosity of 2000 Pa·s;

(3) performing dry spinning on the spinning solution to obtain the as-spun fiber, then stretching the as-spun fiber to obtain the blend fiber;

wherein the dry spinning involves technological parameters: the tank temperature of 95° C., the hot air temperature in the dry spinning tunnel of 180° C., and the spinneret draft ratio of 1.0.

The prepared fibrous binder has the diameter of 30 μm, the length of 7 mm, and the residual carbon rate of 50%.

Example 8

A fibrous binder, prepared by a solution-blending spinning method in the following steps:

(1) adding the phenolic resin (thermoplastic phenolic resin) and the other resin (polyvinyl formaldehyde) to the solvent (methanol), and stirring at 25° C. until completely dissolving to obtain a phenolic resin/other resin blend solution; in the phenolic resin/other resin blend solution, wherein the total content of the phenolic resin and the other resin is 37 wt %, and the mass ratio of the other resin to the phenolic resin is 5:5;

(2) putting the phenolic resin/other resin blend solution at 24° C. for 7 h, then vacuum deaerating to obtain the spinning solution with the viscosity of 1050 Pa·s;

(3) performing dry spinning on the spinning solution to obtain the as-spun fiber, then stretching the as-spun fiber to obtain the blend fiber;

wherein the dry spinning involves technological parameters: the tank temperature of 25° C., the hot air temperature in the dry spinning tunnel of 60° C., and the spinneret draft ratio of 1.1.

The prepared fibrous binder has the diameter of 30 μm, the length of 7 mm, and the residual carbon rate of 45%.

Example 9

A fibrous binder, prepared by a solution-blending spinning method in the following steps:

(1) adding the phenolic resin (thermoplastic phenolic resin) and the other resin (polyvinyl butyral) to the solvent (a mixture of ethanol and ethyl acetate with a mass ratio of 1:1), and stirring at 50° C. until completely dissolving to obtain a phenolic resin/other resin blend solution; in the phenolic resin/other resin blend solution, wherein the total content of the phenolic resin and the other resin is 43 wt %, and the mass ratio of the other resin to the phenolic resin is 5:5;

(2) putting the phenolic resin/other resin blend solution at 25° C. for 6 h, then vacuum deaerating to obtain the spinning solution with the viscosity of 1100 Pa·s;

(3) performing dry spinning on the spinning solution to obtain the as-spun fiber, then stretching the as-spun fiber to obtain the blend fiber;

wherein the dry spinning involves technological parameters: the tank temperature of 75° C., the hot air temperature in the dry spinning tunnel of 90° C., and the spinneret draft ratio of 1.

The prepared fibrous binder has the diameter of 40 μm, the length of 9 mm, and the residual carbon rate of 50%.

Example 10

A method for preparing a gas diffusion layer for proton exchange membrane fuel cell, includes steps as follows:

(1) preparing the carbon fiber suspension;

mixing the carbon fiber dispersion with the fibrous binder dispersion, then shearing and dispersing at a high-speed rate of 20000 r/min to obtain the carbon fiber suspension;

wherein the carbon fiber dispersion consists of the carbon fiber, the dispersant and water;

wherein the fibrous binder dispersion consists of the fibrous binder, the dispersant and water;

wherein the viscosity of dispersion composed of the dispersant and water is 100 Pa·s in the carbon fiber suspension;

wherein the dispersant is polyethylene oxide; wherein the amount of the dispersant in the carbon fiber suspension is 0.05 wt % of the amount of water;

wherein the fibrous binder is the blend fiber prepared in Example 1;

wherein the length of the carbon fiber is 5.6-17.8 mm, the aspect ratio of the carbon fiber is 500-3000, and the mass of carbon fibers with the aspect ratio in the interval [500, 1000) accounts for 74 wt % of the total mass of carbon fibers, the mass of carbon fibers with the aspect ratio in the interval [1000, 2000) accounts for 25 wt % of the total mass of carbon fibers, and the mass of carbon fibers with the aspect ratio in the interval [2000, 3000] accounts for 1 wt % of the total mass of carbon fibers; wherein the amount of the carbon fiber in the carbon fiber suspension is 0.01 wt % of the amount of water;

(2) papermaking and drying the carbon fiber suspension to obtain the carbon fiber base paper;

wherein the drying temperature is 50° C. and the drying time is 90 min;

wherein the content of the fibrous binder in the carbon fiber base paper is 5 wt %;
(3) cross-linking and curing of the carbon fiber base paper (chemical cross-linking);
wherein the process of the chemical cross-linking is: first, immersing the carbon fiber base paper in a cross-linking bath composed of formaldehyde, hydrochloric acid and water (the bath ratio is not limited, as long as complete infiltration can be achieved), pretreating at 22° C. for 60 h, then heating the cross-linking bath at a heating rate of 130° C./h until the solution boils, holding for 3 h, and last, taking out the carbon fiber raw paper, washing and drying; wherein the content of formaldehyde in the cross-linking bath is 18.5 wt %, and the concentration of hydrochloric acid is 12 wt %;
(4) carbonizing and graphitizing the cross-linked carbon fiber base paper under the protection of nitrogen to obtain a gas diffusion layer for proton exchange membrane fuel cell;
wherein the carbonization temperature is 1000° C. and the carbonization time is 60 min; wherein the graphitization temperature is 1500° C. and the graphitization time is 60 min.

The prepared gas diffusion layer for proton exchange membrane fuel cell, wherein the pore size increases or decreases along the thickness direction (that is, with a pore gradient), and the layer with the smallest pore size is the intrinsic microporous layer; wherein the gas diffusion layer for proton exchange membrane fuel cell has a thickness of 80 m, a porosity of 80%, a contact angle with water of 130°, a tensile strength of 25 MPa, a normal resistivity of 65 mQ·cm, an in-plane resistivity of 6.5 mQ·cm, and a permeability of 2100 (mL·mm)/(cm2·h·mmAq).

Example 11

A method for preparing a gas diffusion layer for proton exchange membrane fuel cell, includes steps as follows:
(1) preparing the carbon fiber suspension;
mixing the carbon fiber dispersion with the fibrous binder dispersion, then shearing and dispersing at a high-speed rate of 17000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 200 Pa·s in the carbon fiber suspension;
wherein the dispersant is polyethylene oxide; wherein the amount of the dispersant in the carbon fiber suspension is 0.1 wt % of the amount of water;
wherein the fibrous binder is the blend fiber prepared in Example 2;
wherein the length of the carbon fiber is 4-16 mm, the aspect ratio of the carbon fiber is 500-3000, and the mass of carbon fibers with the aspect ratio in the interval [500, 1000) accounts for 73 wt % of the total mass of carbon fibers, the mass of carbon fibers with the aspect ratio in the interval [1000, 2000) accounts for 25 wt % of the total mass of carbon fibers, and the mass of carbon fibers with the aspect ratio in the interval [2000, 3000] accounts for 2 wt % of the total mass of carbon fibers; wherein the amount of the carbon fiber in the carbon fiber suspension is 0.05 wt % of the amount of water;

(2) papermaking and drying the carbon fiber suspension to obtain the carbon fiber base paper;
wherein the drying temperature is 60° C. and the drying time is 85 min;
wherein the content of the fibrous binder in the carbon fiber base paper is 7 wt %;
(3) cross-linking and curing of the carbon fiber base paper (chemical cross-linking);
wherein the process of the chemical cross-linking is: first, immersing the carbon fiber base paper in a cross-linking bath composed of formaldehyde, hydrochloric acid and water (the bath ratio is not limited, as long as complete infiltration can be achieved), pretreating at 23° C. for 50 h, then heating the cross-linking bath at a heating rate of 140° C./h until the solution boils, holding for 2.5 h, and last, taking out the carbon fiber raw paper, washing and drying; wherein the content of formaldehyde in the cross-linking bath is 18.5 wt %, and the concentration of hydrochloric acid is 13 wt %;
(4) carbonizing and graphitizing the cross-linked carbon fiber base paper under the protection of nitrogen to obtain a gas diffusion layer for proton exchange membrane fuel cell;
wherein the carbonization temperature is 1050° C. and the carbonization time is 50 min; wherein the graphitization temperature is 1600° C. and the graphitization time is 55 min.

The prepared gas diffusion layer for proton exchange membrane fuel cell, wherein the pore size increases or decreases along the thickness direction (that is, with a pore gradient), and the layer with the smallest pore size is the intrinsic microporous layer; wherein the gas diffusion layer for proton exchange membrane fuel cell has a thickness of 130 μm, a porosity of 73%, a contact angle with water of 135°, a tensile strength of 26 MPa, a normal resistivity of 63 mΩ·cm, an in-plane resistivity of 6.6 mΩ·cm, and a permeability of 2000 (mL·mm)/(cm2·h·mmAq).

Example 12

A method for preparing a gas diffusion layer for proton exchange membrane fuel cell, includes steps as follows:
(1) preparing the carbon fiber suspension;
mixing the carbon fiber dispersion with the fibrous binder dispersion, then shearing and dispersing at a high-speed rate of 15000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 300 Pa·s in the carbon fiber suspension;
wherein the dispersant is polyethylene oxide; wherein the amount of the dispersant in the carbon fiber suspension is 0.3 wt % of the amount of water;
wherein the fibrous binder is the blend fiber prepared in Example 3;
wherein the length of the carbon fiber is 6-17 mm, the aspect ratio of the carbon fiber is 500-3000, and the mass of carbon fibers with the aspect ratio in the interval [500, 1000) accounts for 72 wt % of the total mass of carbon fibers, the mass of carbon fibers with the aspect ratio in the interval [1000, 2000) accounts for 25 wt % of the total mass of carbon fibers, and the mass of carbon fibers with the aspect ratio in the interval

[2000, 3000] accounts for 3 wt % of the total mass of carbon fibers: wherein the amount of the carbon fiber in the carbon fiber suspension is 0.1 wt % of the amount of water;
(2) papermaking and drying the carbon fiber suspension to obtain the carbon fiber base paper;
wherein the drying temperature is 70° C. and the drying time is 80 min;
wherein the content of the fibrous binder in the carbon fiber base paper is 10 wt %;
(3) cross-linking and curing of the carbon fiber base paper (chemical cross-linking);
wherein the process of the chemical cross-linking is: first, immersing the carbon fiber base paper in a cross-linking bath composed of formaldehyde, hydrochloric acid and water (the bath ratio is not limited, as long as complete infiltration can be achieved), pretreating at 24° C. for 40 h, then heating the cross-linking bath at a heating rate of 150° C./h until the solution boils, holding for 2 h, and last, taking out the carbon fiber raw paper, washing and drying; wherein the content of formaldehyde in the cross-linking bath is 18.5 wt %, and the concentration of hydrochloric acid is 14 wt %;
(4) carbonizing and graphitizing the cross-linked carbon fiber base paper under the protection of nitrogen to obtain a gas diffusion layer for proton exchange membrane fuel cell;
wherein the carbonization temperature is 1100° C. and the carbonization time is 40 min; wherein the graphitization temperature is 1700° C. and the graphitization time is 50 min.

The prepared gas diffusion layer for proton exchange membrane fuel cell, wherein the pore size increases or decreases along the thickness direction (that is, with a pore gradient), and the layer with the smallest pore size is the intrinsic microporous layer; wherein the gas diffusion layer for proton exchange membrane fuel cell has a thickness of 135 μm, a porosity of 75%, a contact angle with water of 120°, a tensile strength of 27 MPa, a normal resistivity of 66 mΩ·cm, an in-plane resistivity of 6.5 mΩ·cm, and a permeability of 2050 (mL·mm)/(cm2·h·mmAq).

Example 13

A method for preparing a gas diffusion layer for proton exchange membrane fuel cell, includes steps as follows:
(1) preparing the carbon fiber suspension;
mixing the carbon fiber dispersion with the fibrous binder dispersion, then adding carbon powder with graphite structure (carbon nanotube), and then shearing and dispersing at a high-speed rate of 13000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 400 Pa·s in the carbon fiber suspension;
wherein the dispersant is polyethylene oxide; wherein the amount of the dispersant in the carbon fiber suspension is 0.6 wt % of the amount of water;
wherein the fibrous binder is the blend fiber prepared in Example 4;
wherein the length of the carbon fiber is 7-14 mm, the aspect ratio of the carbon fiber is 100-3000, and the mass of carbon fibers with the aspect ratio in the interval [100, 500) accounts for 3 wt % of the total mass of carbon fibers, the mass of carbon fibers with the aspect ratio in the interval [500, 1000) accounts for 73 wt % of the total mass of carbon fibers, the mass of carbon fibers with the aspect ratio in the interval [1000, 2000) accounts for 20 wt % of the total mass of carbon fibers, and the mass of carbon fibers with the aspect ratio in the interval [2000, 3000] accounts for 4 wt % of the total mass of carbon fibers; wherein the amount of the carbon fiber in the carbon fiber suspension is 0.4 wt % of the amount of water;
(2) papermaking and drying the carbon fiber suspension to obtain the carbon fiber base paper;
wherein the drying temperature is 80° C. and the drying time is 75 min;
in the prepared carbon fiber base paper, wherein the content of the fibrous binder is 12 wt %, and the content of the carbon powder with graphite structure is 2 wt %;
(3) cross-linking and curing of the carbon fiber base paper (chemical cross-linking);
wherein the process of the chemical cross-linking is: first, immersing the carbon fiber base paper in a cross-linking bath composed of formaldehyde, hydrochloric acid and water (the bath ratio is not limited, as long as complete infiltration can be achieved), pretreating at 22° C. for 35 h, then heating the cross-linking bath at a heating rate of 160° C./h until the solution boils, holding for 1.5 h, and last, taking out the carbon fiber raw paper, washing and drying; wherein the content of formaldehyde in the cross-linking bath is 18.5 wt %, and the concentration of hydrochloric acid is 15 wt %;
(4) carbonizing and graphitizing the cross-linked carbon fiber base paper under the protection of nitrogen to obtain a gas diffusion layer for proton exchange membrane fuel cell;
wherein the carbonization temperature is 1150° C. and the carbonization time is 30 min; wherein the graphitization temperature is 1800° C. and the graphitization time is 45 min.

The prepared gas diffusion layer for proton exchange membrane fuel cell, wherein the pore size increases or decreases along the thickness direction (that is, with a pore gradient), and the layer with the smallest pore size is the intrinsic microporous layer; wherein the gas diffusion layer for proton exchange membrane fuel cell has a thickness of 155 μm, a porosity of 70%, a contact angle with water of 132°, a tensile strength of 24 MPa, a normal resistivity of 63 mΩ·cm, an in-plane resistivity of 6.2 mΩ·cm, and a permeability of 1990 (mL·mm)/(cm2·h·mmAq).

Example 14

A method for preparing a gas diffusion layer for proton exchange membrane fuel cell, includes steps as follows:
(1) preparing the carbon fiber suspension;
mixing the carbon fiber dispersion with the fibrous binder dispersion, then adding carbon powder with graphite structure (carbon nanotube), and then shearing and dispersing at a high-speed rate of 10000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 500 Pa·s in the carbon fiber suspension;

wherein the dispersant is polyethylene oxide; wherein the amount of the dispersant in the carbon fiber suspension is 0.8 wt % of the amount of water;

wherein the fibrous binder is the blend fiber prepared in Example 5;

wherein the length of the carbon fiber is 0.5-9.5 mm, the aspect ratio of the carbon fiber is 100-3000, and the mass of carbon fibers with the aspect ratio in the interval [100, 500) accounts for 3 wt % of the total mass of carbon fibers, the mass of carbon fibers with the aspect ratio in the interval [500, 1000) accounts for 72 wt % of the total mass of carbon fibers, the mass of carbon fibers with the aspect ratio in the interval [1000, 2000) accounts for 20 wt % of the total mass of carbon fibers, and the mass of carbon fibers with the aspect ratio in the interval [2000, 3000] accounts for 5 wt % of the total mass of carbon fibers; wherein the amount of the carbon fiber in the carbon fiber suspension is 0.8 wt % of the amount of water;

(2) papermaking and drying the carbon fiber suspension to obtain the carbon fiber base paper;

wherein the drying temperature is 90° C. and the drying time is 70 min;

in the prepared carbon fiber base paper, wherein the content of the fibrous binder is 14 wt %, and the content of the carbon powder with graphite structure is 10 wt %;

(3) cross-linking and curing of the carbon fiber base paper (chemical cross-linking);

wherein the process of the chemical cross-linking is: first, immersing the carbon fiber base paper in a cross-linking bath composed of formaldehyde, hydrochloric acid and water (the bath ratio is not limited, as long as complete infiltration can be achieved), pretreating at 23° C. for 32 h, then heating the cross-linking bath at a heating rate of 170° C./h until the solution boils, holding for 1 h, and last, taking out the carbon fiber raw paper, washing and drying; wherein the content of formaldehyde in the cross-linking bath is 18.5 wt %, and the concentration of hydrochloric acid is 16 wt %;

(4) carbonizing and graphitizing the cross-linked carbon fiber base paper under the protection of argon to obtain a gas diffusion layer for proton exchange membrane fuel cell;

wherein the carbonization temperature is 1200° C. and the carbonization time is 20 min; wherein the graphitization temperature is 1900° C. and the graphitization time is 40 min.

The prepared gas diffusion layer for proton exchange membrane fuel cell, wherein the pore size increases or decreases along the thickness direction (that is, with a pore gradient), and the layer with the smallest pore size is the intrinsic microporous layer; wherein the gas diffusion layer for proton exchange membrane fuel cell has a thickness of 160 μm, a porosity of 68%, a contact angle with water of 135°, a tensile strength of 23 MPa, a normal resistivity of 62 mΩ·cm, an in-plane resistivity of 6 mΩ·cm, and a permeability of 1970 (mL·mm)/(cm2·h·mmAq).

Example 15

A method for preparing a gas diffusion layer for proton exchange membrane fuel cell, includes steps as follows:
(1) preparing the carbon fiber suspension;
mixing the carbon fiber dispersion with the fibrous binder dispersion, then adding carbon powder with graphite structure (graphene), and then shearing and dispersing at a high-speed rate of 8900 r/min to obtain the carbon fiber suspension;

wherein the carbon fiber dispersion consists of the carbon fiber, the dispersant and water;

wherein the fibrous binder dispersion consists of the fibrous binder, the dispersant and water;

wherein the viscosity of dispersion composed of the dispersant and water is 600 Pa·s in the carbon fiber suspension;

wherein the dispersant is polyethylene oxide; wherein the amount of the dispersant in the carbon fiber suspension is 0.9 wt % of the amount of water;

wherein the fibrous binder is the blend fiber prepared in Example 6;

wherein the length of the carbon fiber is 1-8 mm, the aspect ratio of the carbon fiber is 100-3000, and the mass of carbon fibers with the aspect ratio in the interval [100, 500) accounts for 3 wt % of the total mass of carbon fibers, the mass of carbon fibers with the aspect ratio in the interval [500, 1000) accounts for 76 wt % of the total mass of carbon fibers, the mass of carbon fibers with the aspect ratio in the interval [1000, 2000) accounts for 20 wt % of the total mass of carbon fibers, and the mass of carbon fibers with the aspect ratio in the interval [2000, 3000] accounts for 1 wt % of the total mass of carbon fibers; wherein the amount of the carbon fiber in the carbon fiber suspension is 1.8 wt % of the amount of water;

(2) papermaking and drying the carbon fiber suspension to obtain the carbon fiber base paper;

wherein the drying temperature is 100° C. and the drying time is 65 min;

in the prepared carbon fiber base paper, wherein the content of the fibrous binder is 17 wt %, and the content of the carbon powder with graphite structure is 20 wt %;

(3) cross-linking and curing of the carbon fiber base paper (chemical cross-linking);

wherein the process of the chemical cross-linking is: first, immersing the carbon fiber base paper in a cross-linking bath composed of formaldehyde, hydrochloric acid and water (the bath ratio is not limited, as long as complete infiltration can be achieved), pretreating at 24° C. for 28 h, then heating the cross-linking bath at a heating rate of 130° C./h until the solution boils, holding for 0.8 h, and last, taking out the carbon fiber raw paper, washing and drying; wherein the content of formaldehyde in the cross-linking bath is 18.5 wt %, and the concentration of hydrochloric acid is 17 wt %;

(4) carbonizing and graphitizing the cross-linked carbon fiber base paper under the protection of argon to obtain a gas diffusion layer for proton exchange membrane fuel cell;

wherein the carbonization temperature is 1250° C. and the carbonization time is 15 min; wherein the graphitization temperature is 2400° C. and the graphitization time is 35 min.

The prepared gas diffusion layer for proton exchange membrane fuel cell, wherein the pore size increases or decreases along the thickness direction (that is, with a pore gradient), and the layer with the smallest pore size is the intrinsic microporous layer; wherein the gas diffusion layer for proton exchange membrane fuel cell has a thickness of 165 μm, a porosity of 66%, a contact angle with water of 140°, a tensile strength of 20 MPa, a normal resistivity of 61 mΩ·cm, an in-plane resistivity of 5.8 mΩ·cm, and a permeability of 1950 (mL·mm)/(cm2·h·mmAq).

Example 16

A method for preparing a gas diffusion layer for proton exchange membrane fuel cell, includes steps as follows:
(1) preparing the carbon fiber suspension;
mixing the carbon fiber dispersion with the fibrous binder dispersion, then adding carbon powder with graphite structure (graphene) and the ceramic fiber of 1 mm length (alumina fiber), and then shearing and dispersing at a high-speed rate of 7000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 700 Pa·s in the carbon fiber suspension;
wherein the dispersant is polyethylene oxide; wherein the amount of the dispersant in the carbon fiber suspension is 1 wt % of the amount of water;
wherein the fibrous binder is the blend fiber prepared in Example 7;
wherein the length of the carbon fiber is 2-9 mm, the aspect ratio of the carbon fiber is 100-3000, and the mass of carbon fibers with the aspect ratio in the interval [100, 500) accounts for 6 wt % of the total mass of carbon fibers, the mass of carbon fibers with the aspect ratio in the interval [500, 1000) accounts for 77 wt % of the total mass of carbon fibers, the mass of carbon fibers with the aspect ratio in the interval [1000, 2000) accounts for 15 wt % of the total mass of carbon fibers, and the mass of carbon fibers with the aspect ratio in the interval [2000, 3000] accounts for 2 wt % of the total mass of carbon fibers; wherein the amount of the carbon fiber in the carbon fiber suspension is 1.4 wt % of the amount of water;
wherein the amount of the ceramic fiber is 0.5 wt % of the amount of the carbon fiber;
(2) papermaking and drying the carbon fiber suspension to obtain the carbon fiber base paper;
wherein the drying temperature is 110° C. and the drying time is 50 min;
in the prepared carbon fiber base paper, wherein the content of the fibrous binder is 19 wt %, and the content of the carbon powder with graphite structure is 30 wt %;
(3) carbonizing and graphitizing the cross-linked carbon fiber base paper under the protection of nitrogen to obtain a gas diffusion layer for proton exchange membrane fuel cell;
wherein the carbonization temperature is 1300° C. and the carbonization time is 10 min; wherein the graphitization temperature is 2100° C. and the graphitization time is 30 min.

The prepared gas diffusion layer for proton exchange membrane fuel cell has hydrophilic channels composed of the ceramic fiber, and the pore gradient (that is, the pore size increases or decreases along the thickness direction), and the layer with the smallest pore size is the intrinsic microporous layer; wherein the gas diffusion layer for proton exchange membrane fuel cell has a thickness of 170 μm, a porosity of 63%, a contact angle with water of 137°, a tensile strength of 19 MPa, a normal resistivity of 60 mΩ·cm, an in-plane resistivity of 5.5 mΩ·cm, and a permeability of 1930 (mL·mm)/(cm2·h·mmAq).

Example 17

A method for preparing a gas diffusion layer for proton exchange membrane fuel cell, includes steps as follows:
(1) preparing the carbon fiber suspension;
mixing the carbon fiber dispersion with the fibrous binder dispersion, then adding carbon powder with graphite structure (graphene) and the ceramic fiber of 2 mm length (alumina fiber), and then shearing and dispersing at a high-speed rate of 6000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 800 Pa·s in the carbon fiber suspension;
wherein the dispersant is Tween 60; wherein the amount of the dispersant in the carbon fiber suspension is 1.05 wt % of the amount of water;
wherein the fibrous binder is the blend fiber prepared in Example 8;
wherein the length of the carbon fiber is 2.5-10 mm, the aspect ratio of the carbon fiber is 100-3000, and the mass of carbon fibers with the aspect ratio in the interval [100, 500) accounts for 6 wt % of the total mass of carbon fibers, the mass of carbon fibers with the aspect ratio in the interval [500, 1000) accounts for 76 wt % of the total mass of carbon fibers, the mass of carbon fibers with the aspect ratio in the interval [1000, 2000) accounts for 15 wt % of the total mass of carbon fibers, and the mass of carbon fibers with the aspect ratio in the interval [2000, 3000] accounts for 3 wt % of the total mass of carbon fibers; wherein the amount of the carbon fiber in the carbon fiber suspension is 3.5 wt % of the amount of water;
wherein the amount of the ceramic fiber is 1 wt % of the amount of the carbon fiber;
(2) papermaking and drying the carbon fiber suspension to obtain the carbon fiber base paper;
wherein the drying temperature is 120° C. and the drying time is 40 min;
in the prepared carbon fiber base paper, wherein the content of the fibrous binder is 22 wt %, and the content of the carbon powder with graphite structure is 35 wt %;
(3) cross-linking and curing of the carbon fiber base paper (hot-pressing cross-linking);
wherein the temperature of hot-pressing cross-linking is 140° C., the time of hot-pressing cross-linking is 30 min, and the pressure applied to the carbon fiber base paper is 15 MPa;
(4) carbonizing and graphitizing the cross-linked carbon fiber base paper under the protection of argon to obtain a gas diffusion layer for proton exchange membrane fuel cell;
wherein the carbonization temperature is 1000° C. and the carbonization time is 60 min; wherein the graphitization temperature is 2000° C. and the graphitization time is 25 min.

The prepared gas diffusion layer for proton exchange membrane fuel cell has hydrophilic channels composed of the ceramic fiber, and the pore gradient (that is, the pore size increases or decreases along the thickness direction), and the layer with the smallest pore size is the intrinsic microporous layer; wherein the gas diffusion layer for proton exchange membrane fuel cell has a thickness of 180 μm, a porosity of 62%, a contact angle with water of 140°, a tensile strength of 18 MPa, a normal resistivity of 59 mΩ·cm, an in-plane resistivity of 5 mΩ·cm, and a permeability of 1910 (mL·mm)/(cm2·h·mmAq).

Example 18

A method for preparing a gas diffusion layer for proton exchange membrane fuel cell, includes steps as follows:
(1) preparing the carbon fiber suspension;
mixing the carbon fiber dispersion with the fibrous binder dispersion, then adding carbon powder with graphite structure (conductive carbon black) and the ceramic fiber of 3 mm length (alumina fiber), and then shearing and dispersing at a high-speed rate of 5000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 900 Pa·s in the carbon fiber suspension;
wherein the dispersant is Tween 60; wherein the amount of the dispersant in the carbon fiber suspension is 1.1 wt % of the amount of water;
wherein the fibrous binder is the blend fiber prepared in Example 9;
wherein the length of the carbon fiber is 3-11 mm, the aspect ratio of the carbon fiber is 100-3000, and the mass of carbon fibers with the aspect ratio in the interval [100, 500) accounts for 6 wt % of the total mass of carbon fibers, the mass of carbon fibers with the aspect ratio in the interval [500, 1000) accounts for 75 wt % of the total mass of carbon fibers, the mass of carbon fibers with the aspect ratio in the interval [1000, 2000) accounts for 15 wt % of the total mass of carbon fibers, and the mass of carbon fibers with the aspect ratio in the interval [2000, 3000] accounts for 4 wt % of the total mass of carbon fibers; wherein the amount of the carbon fiber in the carbon fiber suspension is 3.9 wt % of the amount of water;
wherein the amount of the ceramic fiber is 1.5 wt % of the amount of the carbon fiber;
(2) papermaking and drying the carbon fiber suspension to obtain the carbon fiber base paper;
wherein the drying temperature is 120° C. and the drying time is 30 min;
in the prepared carbon fiber base paper, wherein the content of the fibrous binder is 24 wt %, and the content of the carbon powder with graphite structure is 40 wt %;
(3) cross-linking and curing of the carbon fiber base paper (hot-pressing cross-linking);
wherein the temperature of hot-pressing cross-linking is 180° C., the time of hot-pressing cross-linking is 25 min, and the pressure applied to the carbon fiber base paper is 13 MPa;
(4) carbonizing and graphitizing the cross-linked carbon fiber base paper under the protection of argon to obtain a gas diffusion layer for proton exchange membrane fuel cell;
wherein the carbonization temperature is 1050° C. and the carbonization time is 50 min; wherein the graphitization temperature is 2100° C. and the graphitization time is 20 min.

The prepared gas diffusion layer for proton exchange membrane fuel cell has hydrophilic channels composed of the ceramic fiber, and the pore gradient (that is, the pore size increases or decreases along the thickness direction), and the layer with the smallest pore size is the intrinsic microporous layer; wherein the gas diffusion layer for proton exchange membrane fuel cell has a thickness of 200 μm, a porosity of 62%, a contact angle with water of 150°, a tensile strength of 15 MPa, a normal resistivity of 58 mΩ·cm, an in-plane resistivity of 4.5 mΩ·cm, and a permeability of 1900 (mL·mm)/(cm2·h·mmAq).

Example 19

A method for preparing a gas diffusion layer for proton exchange membrane fuel cell, includes steps as follows:
(1) preparing the carbon fiber suspension;
mixing the carbon fiber dispersion with the fibrous binder dispersion, then adding carbon powder with graphite structure (conductive carbon black) and the ceramic fiber of 1 mm length (zirconia fiber), and then shearing and dispersing at a high-speed rate of 4000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 1200 Pa·s in the carbon fiber suspension;
wherein the dispersant is Tween 60; wherein the amount of the dispersant in the carbon fiber suspension is 1.2 wt % of the amount of water;
wherein the fibrous binder is the composite filament numbered F-1 in Table 1;
wherein the length of the carbon fiber is 4-12 mm, the aspect ratio of the carbon fiber is 100-3000, and the mass of carbon fibers with the aspect ratio in the interval [100, 500) accounts for 9 wt % of the total mass of carbon fibers, the mass of carbon fibers with the aspect ratio in the interval [500, 1000) accounts for 76 wt % of the total mass of carbon fibers, the mass of carbon fibers with the aspect ratio in the interval [1000, 2000) accounts for 10 wt % of the total mass of carbon fibers, and the mass of carbon fibers with the aspect ratio in the interval [2000, 3000] accounts for 5 wt % of the total mass of carbon fibers; wherein the amount of the carbon fiber in the carbon fiber suspension is 4.2 wt % of the amount of water;
wherein the amount of the ceramic fiber is 2 wt % of the amount of the carbon fiber;
(2) papermaking and drying the carbon fiber suspension to obtain the carbon fiber base paper;
wherein the drying temperature is 130° C. and the drying time is 20 min;
in the prepared carbon fiber base paper, wherein the content of the fibrous binder is 25 wt %, and the content of the carbon powder with graphite structure is 50 wt %;
(3) cross-linking and curing of the carbon fiber base paper (hot-pressing cross-linking);

wherein the temperature of hot-pressing cross-linking is 220° C., the time of hot-pressing cross-linking is 20 min, and the pressure applied to the carbon fiber base paper is 10 MPa;

(4) carbonizing and graphitizing the cross-linked carbon fiber base paper under the protection of argon to obtain a gas diffusion layer for proton exchange membrane fuel cell;

wherein the carbonization temperature is 1100° C. and the carbonization time is 40 min; wherein the graphitization temperature is 2200° C. and the graphitization time is 15 min.

The prepared gas diffusion layer for proton exchange membrane fuel cell has hydrophilic channels composed of the ceramic fiber, and the pore gradient (that is, the pore size increases or decreases along the thickness direction), and the layer with the smallest pore size is the intrinsic microporous layer; wherein the gas diffusion layer for proton exchange membrane fuel cell has a thickness of 210 μm, a porosity of 61%, a contact angle with water of 153°, a tensile strength of 13 MPa, a normal resistivity of 57 mΩ·cm, an in-plane resistivity of 4 mΩ·cm, and a permeability of 1870 (mL·mm)/(cm2·h·mmAq).

Example 20

A method for preparing a gas diffusion layer for proton exchange membrane fuel cell, includes steps as follows:

(1) preparing the carbon fiber suspension;
mixing the carbon fiber dispersion with the fibrous binder dispersion, then adding carbon powder with graphite structure (conductive carbon black) and the ceramic fiber of 2 mm length (zirconia fiber), and then shearing and dispersing at a high-speed rate of 3000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 1500 Pa·s in the carbon fiber suspension;
wherein the dispersant is Tween 60; wherein the amount of the dispersant in the carbon fiber suspension is 1.3 wt % of the amount of water;
wherein the fibrous binder is the composite filament numbered F-2 in Table 1;
wherein the length of the carbon fiber is 7-15 mm, the aspect ratio of the carbon fiber is 100-3000, and the mass of carbon fibers with the aspect ratio in the interval [100, 500) accounts for 9 wt % of the total mass of carbon fibers, the mass of carbon fibers with the aspect ratio in the interval [500, 1000) accounts for 80 wt % of the total mass of carbon fibers, the mass of carbon fibers with the aspect ratio in the interval [1000, 2000) accounts for 10 wt % of the total mass of carbon fibers, and the mass of carbon fibers with the aspect ratio in the interval [2000, 3000] accounts for 1 wt % of the total mass of carbon fibers; wherein the amount of the carbon fiber in the carbon fiber suspension is 4.8 wt % of the amount of water;
wherein the amount of the ceramic fiber is 3.5 wt % of the amount of the carbon fiber;

(2) papermaking and drying the carbon fiber suspension to obtain the carbon fiber base paper;
wherein the drying temperature is 140° C. and the drying time is 15 min;
in the prepared carbon fiber base paper, wherein the content of the fibrous binder is 27 wt %, and the content of the carbon powder with graphite structure is 60 wt %;

(3) cross-linking and curing of the carbon fiber base paper (hot-pressing cross-linking);

wherein the temperature of hot-pressing cross-linking is 250° C., the time of hot-pressing cross-linking is 15 min, and the pressure applied to the carbon fiber base paper is 9 MPa;

(4) carbonizing and graphitizing the cross-linked carbon fiber base paper under the protection of argon to obtain a gas diffusion layer for proton exchange membrane fuel cell;

wherein the carbonization temperature is 1150° C. and the carbonization time is 30 min; wherein the graphitization temperature is 2200° C. and the graphitization time is 10 min.

The prepared gas diffusion layer for proton exchange membrane fuel cell has hydrophilic channels composed of the ceramic fiber, and the pore gradient (that is, the pore size increases or decreases along the thickness direction), and the layer with the smallest pore size is the intrinsic microporous layer; wherein the gas diffusion layer for proton exchange membrane fuel cell has a thickness of 220 μm, a porosity of 60%, a contact angle with water of 155°, a tensile strength of 10 MPa, a normal resistivity of 55 mΩ·cm, an in-plane resistivity of 3.5 mΩ·cm, and a permeability of 1850 (mL·mm)/(cm2·h·mmAq).

Example 21

A method for preparing a gas diffusion layer for proton exchange membrane fuel cell, includes steps as follows:

(1) preparing the carbon fiber suspension;
mixing the carbon fiber dispersion with the fibrous binder dispersion, then adding the ceramic fiber of 3 mm length (zirconia fiber), and then shearing and dispersing at a high-speed rate of 2000 r/min to obtain the carbon fiber suspension;
wherein the carbon fiber dispersion consists of the carbon fiber, the dispersant and water;
wherein the fibrous binder dispersion consists of the fibrous binder, the dispersant and water;
wherein the viscosity of dispersion composed of the dispersant and water is 1700 Pa·s in the carbon fiber suspension;
wherein the dispersant is Tween 60; wherein the amount of the dispersant in the carbon fiber suspension is 1.4 wt % of the amount of water;
wherein the fibrous binder is the composite filament numbered F-3 in Table 1;
wherein the length of the carbon fiber is 8-16 mm, the aspect ratio of the carbon fiber is 100-3000, and the mass of carbon fibers with the aspect ratio in the interval [100, 500) accounts for 9 wt % of the total mass of carbon fibers, the mass of carbon fibers with the aspect ratio in the interval [500, 1000) accounts for 84 wt % of the total mass of carbon fibers, the mass of carbon fibers with the aspect ratio in the interval [1000, 2000) accounts for 5 wt % of the total mass of carbon fibers, and the mass of carbon fibers with the aspect ratio in the interval [2000, 3000] accounts for 2 wt % of the total mass of carbon fibers; wherein the amount of the carbon fiber in the carbon fiber suspension is 2.5 wt % of the amount of water;

wherein the amount of the ceramic fiber is 4 wt % of the amount of the carbon fiber;

(2) papermaking and drying the carbon fiber suspension to obtain the carbon fiber base paper;

wherein the drying temperature is 150° C. and the drying time is 10 min;

in the prepared carbon fiber base paper, wherein the content of the fibrous binder is 29 wt %;

(3) cross-linking and curing of the carbon fiber base paper (hot-pressing cross-linking);

wherein the temperature of hot-pressing cross-linking is 280° C., the time of hot-pressing cross-linking is 10 min, and the pressure applied to the carbon fiber base paper is 7 MPa;

(4) carbonizing and graphitizing the cross-linked carbon fiber base paper under the protection of argon to obtain a gas diffusion layer for proton exchange membrane fuel cell;

wherein the carbonization temperature is 1200° C. and the carbonization time is 20 min; wherein the graphitization temperature is 2000° C. and the graphitization time is 10 min.

The prepared gas diffusion layer for proton exchange membrane fuel cell has hydrophilic channels composed of the ceramic fiber, and the pore gradient (that is, the pore size increases or decreases along the thickness direction), and the layer with the smallest pore size is the intrinsic microporous layer; wherein the gas diffusion layer for proton exchange membrane fuel cell has a thickness of 180 μm, a porosity of 75%, a contact angle with water of 140°, a tensile strength of 13 MPa, a normal resistivity of 67 mΩ·cm, an in-plane resistivity of 6.6 mΩ·cm, and a permeability of 1980 (mL·mm)/(cm2·h·mmAq).

Example 22

A method for preparing a gas diffusion layer for proton exchange membrane fuel cell, includes steps as follows:

(1) preparing the carbon fiber suspension;

mixing the carbon fiber dispersion with the fibrous binder dispersion, then adding the ceramic fiber of 1 mm length (zirconia fiber), and then shearing and dispersing at a high-speed rate of 1500 r/min to obtain the carbon fiber suspension;

wherein the carbon fiber dispersion consists of the carbon fiber, the dispersant and water;

wherein the fibrous binder dispersion consists of the fibrous binder, the dispersant and water;

wherein the viscosity of dispersion composed of the dispersant and water is 2000 Pa·s in the carbon fiber suspension;

wherein the dispersant is Tween 60; wherein the amount of the dispersant in the carbon fiber suspension is 1.5 wt % of the amount of water;

wherein the fibrous binder is the composite filament numbered F-4 in Table 1;

wherein the length of the carbon fiber is 10-20 mm, the aspect ratio of the carbon fiber is 100-3000, and the mass of carbon fibers with the aspect ratio in the interval [100, 500) accounts for 10 wt % of the total mass of carbon fibers, the mass of carbon fibers with the aspect ratio in the interval [500, 1000) accounts for 60 wt % of the total mass of carbon fibers, the mass of carbon fibers with the aspect ratio in the interval [1000, 2000) accounts for 25 wt % of the total mass of carbon fibers, and the mass of carbon fibers with the aspect ratio in the interval [2000, 3000] accounts for 5 wt % of the total mass of carbon fibers; wherein the amount of the carbon fiber in the carbon fiber suspension is 5 wt % of the amount of water;

wherein the amount of the ceramic fiber is 5 wt % of the amount of the carbon fiber;

(2) papermaking and drying the carbon fiber suspension to obtain the carbon fiber base paper;

wherein the drying temperature is 140° C. and the drying time is 5 min;

in the prepared carbon fiber base paper, wherein the content of the fibrous binder is 30 wt %;

(3) cross-linking and curing of the carbon fiber base paper (hot-pressing cross-linking);

wherein the temperature of hot-pressing cross-linking is 300° C., the time of hot-pressing cross-linking is 5 min, and the pressure applied to the carbon fiber base paper is 5 MPa;

(4) carbonizing and graphitizing the cross-linked carbon fiber base paper under the protection of argon to obtain a gas diffusion layer for proton exchange membrane fuel cell;

wherein the carbonization temperature is 1250° C. and the carbonization time is 15 min; wherein the graphitization temperature is 2000° C. and the graphitization time is 5 min.

The prepared gas diffusion layer for proton exchange membrane fuel cell has hydrophilic channels composed of the ceramic fiber, and the pore gradient (that is, the pore size increases or decreases along the thickness direction), and the layer with the smallest pore size is the intrinsic microporous layer; wherein the gas diffusion layer for proton exchange membrane fuel cell has a thickness of 100 μm, a porosity of 70%, a contact angle with water of 145°, a tensile strength of 30 Ma, a normal resistivity of 70 mΩ·cm, an in-plane resistivity of 7 mΩ·cm, and a permeability of 2060 (mL·mm)/(cm2·h·mmAq).

What is claimed is:

1. A method for preparing a gas diffusion layer for a proton exchange membrane fuel cell, comprising; papermaking and drying a carbon fiber suspension composed of a fibrous binder, water, a dispersant, and carbon fibers with different aspect ratios to obtain a carbon fiber base paper, and then carbonizing and graphitizing under a protection of nitrogen or an inert gas to obtain the gas diffusion layer for the proton exchange membrane fuel cell;

wherein the fibrous binder is a composite fiber or a blend fiber composed of a phenolic resin and other resin;

wherein the other resin is one or more selected from the group consisting of polyvinyl alcohol, polyvinyl formaldehyde, polyvinyl butyral, polyethylene and polypropylene;

wherein a length of the carbon fibers is 0.5-20 mm, the aspect ratios of the carbon fibers ranges 100-3000, and a mass of carbon fibers with aspect ratios in an interval [100, 500) accounts for 0-10 wt % of a total mass of the carbon fibers, a mass of carbon fibers with aspect ratios in an interval [500, 1000) accounts for 60-84 wt % of the total mass of the carbon fibers, a mass of carbon fibers with aspect ratios in an interval [1000, 2000) accounts for 5-25 wt % of the total mass of the carbon fibers, and a mass of carbon fibers with aspect ratios in an interval [2000, 3000] accounts for 1-5 wt % of the total mass of the carbon fibers; wherein an amount of the carbon fibers in the carbon fiber suspension is 0.01-5 wt % of an amount of the water;

wherein the fibrous binder has a diameter of 5-50 μm, a length of 3-10 mm, and a residual carbon rate of 6-50%, and a content of the fibrous binder in the carbon fiber base paper is 5-30 wt %;

wherein the dispersant is polyethylene oxide or Tween 60, and an amount of the dispersant in the carbon fiber suspension is 0.05-1.5 wt % of the amount of water; and wherein a viscosity of a dispersion composed of the dispersant and the water is 100-2000 Pa·s in the carbon fiber suspension.

2. The method of claim 1, wherein the carbon fiber suspension further contains a carbon powder with a graphite structure, and a content of the carbon powder with the graphite structure in the carbon fiber base paper is 2-60 wt %.

3. The method of claim 1, wherein the carbon fiber suspension further contains a ceramic fiber, an amount of the ceramic fiber in the carbon fiber suspension is 0.5-5 wt % of the amount of the carbon fiber, and a length of the ceramic fiber is 1-3 mm.

4. The method of claim 1, wherein a drying temperature is 50-150° C. and a drying time is 5-90 min; wherein a carbonization temperature is 1000-1300° C. and a carbonization time is 10-60 min; wherein a graphitization temperature is 1500-2400° C. and a graphitization time is 5-60 min.

5. The method of claim 4, wherein before the carbonizing, the carbon fiber base paper is subjected to a cross-linking and a curing treatment, and the cross-linking is a chemical cross-linking or a hot-pressing cross-linking;

wherein a process of the chemical cross-linking is: first, immersing the carbon fiber base paper in a cross-linking bath composed of formaldehyde, hydrochloric acid, and water, pretreating at 22-25° C. for 24-60 h, then heating the cross-linking bath at a heating rate of 130-170° C./h until the solution boils, holding for 0.5-3 h, and last, taking out a carbon fiber raw paper, washing and drying; wherein a content of the formaldehyde in the cross-linking bath is 18.5 wt %, and a concentration of the hydrochloric acid is 12-18 wt %;

wherein a temperature of the hot-pressing cross-linking is 140-300° C., a time of the hot-pressing cross-linking is 5-30 min, and a pressure applied to the carbon fiber base paper is 5-15 MPa.

6. The method of claim 1, wherein the phenolic resin is a thermoplastic phenolic resin, a thermosetting phenolic resin, or a blend of the thermoplastic phenolic resin and the thermosetting phenolic resin with a mass ratio of (9-1):(1-9); wherein a content of the phenolic resin in the fibrous binder is 10-50 wt %; wherein the composite fiber is a sea-island fiber, a sheath-core fiber, a side-by-side fiber, or a segmented-pie fiber; wherein the blend fiber is made from two or more resins prepared by a melt-blending spinning or a solution-blending spinning.

7. The method of claim 6, wherein the steps of the melt-blending spinning are as follows:

(1) putting the phenolic resin and the other resin into a screw for a melting to obtain a uniformly mixed phenolic resin/other resin melt;

(2) extruding the melt through a spinneret hole to form a thin stream of melt;

(3) cooling and curing the thin stream of melt to form an as-spun fiber;

(4) oiling and winding the as-spun fiber to obtain the blend fiber;

wherein the steps of the solution-blending spinning are as follows:

(1) adding the phenolic resin and the other resin to a solvent, and stirring at 25-98° C. until completely dissolving to obtain a phenolic resin/other resin blend solution;

(2) putting the phenolic resin/other resin blend solution at 20-25° C. for more than 6 h to obtain a second resulting solution, then vacuum deaerating the second resulting solution to obtain a spinning solution;

(3) performing a dry spinning, a wet spinning, or a dry-wet spinning on the spinning solution to obtain the as-spun fiber, then stretching the as-spun fiber to obtain the blend fiber;

in the phenolic resin/other resin blend solution, wherein a total content of the phenolic resin and the other resin is 5-50 wt %, and a mass ratio of the other resin to the phenolic resin is (9-5):(1-5);

wherein viscosity of the spinning solution is 20-2000 Pa·s;

wherein the dry spinning involves technological parameters: a tank temperature of 25-95° C., a hot air temperature in a dry spinning tunnel of 25-190° C., and a spinneret draft ratio of 0.4-1.8;

wherein the wet spinning involves technological parameters: a coagulation bath temperature of 25-65° C., and a spinneret draft ratio of (−0.5)-1.0;

wherein the dry-wet spinning involves technological parameters: a tank temperature of 25-95° C., a coagulation bath temperature of 0-25° C., and a spinneret draft ratio of 0.55-1.35.

8. A gas diffusion layer for the proton exchange membrane fuel cell prepared by the method of claim 1, wherein a pore size increases or decreases along a thickness direction, and a layer with a smallest pore size is an intrinsic microporous layer.

9. The gas diffusion layer of claim 8, wherein the gas diffusion layer for the proton exchange membrane fuel cell has a thickness of 80-220 μm, a porosity of 60%-80%, a contact angle with water of 120-155°, a tensile strength of 10-30 MPa, a normal resistivity of 55-70 mΩ·cm, an in-plane resistivity of 3.5-7.0 mΩ·cm, and a permeability of 1850-2100 (mL·mm)/(cm2·h·mmAq).

10. The gas diffusion layer of claim 8, wherein the carbon fiber suspension further contains a carbon powder with a graphite structure, and a content of the carbon powder with the graphite structure in the carbon fiber base paper is 2-60 wt %.

11. The gas diffusion layer of claim 8, wherein the carbon fiber suspension further contains a ceramic fiber, an amount of the ceramic fiber in the carbon fiber suspension is 0.5-5 wt % of the amount of the carbon fibers, and a length of the ceramic fiber is 1-3 mm.

12. The gas diffusion layer of claim 8, wherein a drying temperature is 50-150° C. and a drying time is 5-90 min; wherein a carbonization temperature is 1000-1300° C. and a carbonization time is 10-60 min; wherein a graphitization temperature is 1500-2400° C. and a graphitization time is 5-60 min.

13. The gas diffusion layer of claim 12, wherein before the carbonizing, the carbon fiber base paper is subjected to a cross-linking and a curing treatment, and the cross-linking is a chemical cross-linking or a hot-pressing cross-linking;

wherein a process of the chemical cross-linking is: first, immersing the carbon fiber base paper in a cross-linking bath composed of formaldehyde, hydrochloric acid, and water, pretreating at 22-25° C. for 24-60 h, then heating the cross-linking bath at a heating rate of 130-170° C./h until the solution boils, holding for 0.5-3 h, and last, taking out a carbon fiber raw paper, washing and drying; wherein a content of the formaldehyde in the cross-linking bath is 18.5 wt %, and a concentration of the hydrochloric acid is 12-18 wt %;

wherein a temperature of the hot-pressing cross-linking is 140-300° C., a time of the hot-pressing cross-linking is 5-30 min, and a pressure applied to the carbon fiber base paper is 5-15 MPa.

14. The gas diffusion layer of claim 8, wherein the phenolic resin is a thermoplastic phenolic resin, a thermosetting phenolic resin, or a blend of the thermoplastic phenolic resin and the thermosetting phenolic resin with a mass ratio of (9-1):(1-9); wherein a content of the phenolic resin in the fibrous binder is 10-50 wt %; wherein the composite fiber is a sea-island fiber, a sheath-core fiber, a side-by-side fiber, or a segmented-pie fiber; wherein the blend fiber is made from two or more resins prepared by a melt-blending spinning or a solution-blending spinning.

15. The gas diffusion layer of claim 14, wherein the steps of the melt-blending spinning are as follows:
(1) putting the phenolic resin and the other resin into a screw for a melting to obtain a uniformly mixed phenolic resin/other resin melt;
(2) extruding the melt through a spinneret hole to form a thin stream of melt;
(3) cooling and curing the thin stream of melt to form an as-spun fiber;
(4) oiling and winding the as-spun fiber to obtain the blend fiber;

wherein the steps of the solution-blending spinning are as follows:

(4) adding the phenolic resin and the other resin to a solvent, and stirring at 25-98° C. until completely dissolving to obtain a phenolic resin/other resin blend solution;
(5) putting the phenolic resin/other resin blend solution at 20-25° C. for more than 6 h to obtain a second resulting solution, then vacuum deaerating the second resulting solution to obtain a spinning solution;
(6) performing a dry spinning, a wet spinning, or a dry-wet spinning on the spinning solution to obtain the as-spun fiber, then stretching the as-spun fiber to obtain the blend fiber;

in the phenolic resin/other resin blend solution, wherein a total content of the phenolic resin and the other resin is 5-50 wt %, and a mass ratio of the other resin to the phenolic resin is (9-5):(1-5);

wherein a viscosity of the spinning solution is 20-2000 Pa·s;

wherein the dry spinning involves technological parameters: a tank temperature of 25-95° C., a hot air temperature in a dry spinning tunnel of 25-190° C., and a spinneret draft ratio of 0.4-1.8;

wherein the wet spinning involves technological parameters: a coagulation bath temperature of 25-65° C., and a spinneret draft ratio of (−0.5)-1.0;

wherein the dry-wet spinning involves technological parameters: a tank temperature of 25-95° C., a coagulation bath temperature of 0-25° C., and a spinneret draft ratio of 0.55-1.35.

* * * * *